(12) United States Patent
Nakata et al.

(10) Patent No.: US 7,501,030 B2
(45) Date of Patent: Mar. 10, 2009

(54) HOT-ROLLED STEEL STRIP FOR HIGH STRENGTH ELECTRIC RESISTANCE WELDING PIPE AND MANUFACTURING METHOD THEREOF

(75) Inventors: Hiroshi Nakata, Okayama (JP); Nobuyuki Kageyama, Tokyo (JP); Koji Iwata, Okayama (JP); Tetsuo Shimizu, Chiba (JP); Chikara Kami, Okayama (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 10/807,693

(22) Filed: Mar. 24, 2004

(65) Prior Publication Data

US 2004/0187982 A1    Sep. 30, 2004

(30) Foreign Application Priority Data

| Mar. 27, 2003 | (JP) | ............................. 2003-089125 |
| Mar. 28, 2003 | (JP) | ............................. 2003-090069 |
| Dec. 16, 2003 | (JP) | ............................. 2003-417881 |

(51) Int. Cl.
*C22C 38/00* (2006.01)
*C21D 9/52* (2006.01)

(52) U.S. Cl. ............................. 148/320; 148/653; 420/8
(58) Field of Classification Search ................. 148/320, 148/653
See application file for complete search history.

(56) References Cited

U.S. PATENT DOCUMENTS

| 3,241,215 A | * | 3/1966 | Unrath ........................ 29/33 D |
| 3,849,209 A | * | 11/1974 | Ishizaki et al. .............. 148/602 |
| 5,948,183 A | * | 9/1999 | Okada et al. ................. 148/330 |
| 6,110,299 A | * | 8/2000 | Tosaka et al. ................ 148/320 |

FOREIGN PATENT DOCUMENTS

| EP | 0 733 715 A | 9/1996 |
| JP | 01-025916 | 1/1989 |
| JP | 04-120241 | 4/1992 |
| JP | 08-319538 A | 12/1996 |
| JP | 11-189840 | 7/1999 |
| JP | 15-147477 | * 5/2003 |
| JP | 2004-84019 A | * 3/2004 |
| WO | 03/006699 A | 1/2003 |

OTHER PUBLICATIONS

ASM International, Materials Park, Ohio, Properties and Selection: Irons, Steels, and High-Performance Alloys, vol. 1, "Service Characteristics of Carbon and Low-Alloy Steels", pp. 742, Mar. 1990.*

* cited by examiner

*Primary Examiner*—John P. Sheehan
*Assistant Examiner*—Jessee R. Roe
(74) *Attorney, Agent, or Firm*—DLA Piper LLP (US)

(57) ABSTRACT

A hot-rolled steel strip having superior low temperature toughness and weldability, which is suitably used as a starting material for high strength electric resistance welding pipe, is provided at a low cost without constructing new production facilities and increasing cost. The hot-rolled steel strip is low carbon steel containing at least one of about 0.5.% or less of Cu, about 0.5% or less of Ni, and about 0.5% or less of Mo, wherein Pcm represented by the following equation (1) is 0.17 or less:

$Pcm = (\% C) + (\% Si)/30 + ((\% Mn) + (\% Cu))/20 + (\% Ni)/60 + (\% Mo)/7 + (\% V)/10$    Equation (1), (where (% M) indicates the content of element M on a mass percent basis), and the balance includes Fe and incidental impurities. In addition, in the entire microstructure, the ratio of bainitic ferrite, which is a primary phase, is controlled to be about 95 percent by volume or more.

11 Claims, 4 Drawing Sheets

HOT-ROLLED STEEL STRIP FOR HIGH STRENGTH ELECTRIC RESISTANCE WELDING PIPE AND MANUFACTURING METHOD THEREOF

BACKGROUND

1. Technical Field

This disclosure relates to hot-rolled steel strips for high strength electric resistance welding pipes and manufacturing methods thereof, in which the hot-rolled steel strips have superior low temperature toughness and weldability and are suitable starting materials for forming line pipes, oil well pipes, and the like.

2. Description of the Related Art

Mining crude oil and natural gas and construction of pipe lines have been actively performed in arctic regions, such as the North Sea, Canada and Alaska, since the oil crisis. Steel pipes used for pipelines are called "line pipes." The diameter of the line pipes has been increased to improve their transportation efficiency for natural gas and oil. At the same time, their use tends to be performed under higher pressure conditions. As linepipe steel capable of satisfying the needs described above, steel products have been increasingly required, which have a large thickness or a high strength, superior low temperature toughness, and superior weldability, and which can be manufactured at a low cost.

It has been desired that the linepipe steel have a lower carbon content to avoid degradation in toughness which is partly caused by increase in hardness difference between a weld metal of a weld portion and a heat affected zone (HAZ) since girth welding must be performed for linepipe steel in the field at which construction or the like is actually performed.

Steel plates and hot steel strips (hot-rolled steel strips) have been used as starting materials for steel pipes. For example, in Japanese Unexamined Patent Application Publication No. 11-189840, a technique has been disclosed which provides a steel plate as a starting material for linepipe steel having superior hydrogen induced cracking resistance.

As for the hot-rolled strips, a manufacturing method has been disclosed in Japanese Unexamined Patent Application Publication No. 64-25916 which comprises rolling a slab having a lower carbon content at a temperature of $Ar_3$ or more, rapidly cooling the obtained steel sheet at a cooling rate of 20° C./sec or more, and coiling the steel sheet thus cooled at a temperature of 250° C. or less.

In addition, as a manufacturing method of hot-rolled strips similar to that described above, a method for refining a surface of a hot-rolled strip has been disclosed in Japanese Unexamined Patent Application Publication No. 2001-207220. In that method, after the surface temperature of a steel sheet which is processed by rough rolling is decreased to a temperature of $Ar_3$ or less, the steel sheet is then again heated to a temperature of $Ar_3$ or more with its own heat or by heating from the outside. In a ferrite/austenite inverse transformation process which occurs concomitant with the above heating, finish rolling is completed, whereby the surface of the hot-rolled strip is refined.

It is necessary that the linepipe steel have a higher strength or a larger thickness, as described above in consideration of the use of line pipes under higher pressure conditions. As thick-walled steel pipes, in general, UOE steel pipes made from steel plates have been widely known.

On the other hand, since a hot-rolled steel strip manufactured by a hot rolling mill can be continuously formed into pipes by the steps of coiling a product obtained from a relatively large slab, feeding a part of the product having a requested length to a pipe forming step, and continuously forming pipes therefrom, it is advantageous in terms of production efficiency of steel pipes. In addition, in some hot rolling lines, after intermediate coils processed by rough rolling are connected to each other, continuous rolling can be executed. Hence, the productivity thereof is higher than that of steel plates. As a result, inexpensive starting material for hot-rolled steel strips as compared to that for steel plates may be provided.

Furthermore, UOE steel pipes made from steel plates are formed by press molding which is performed at least two times. Hence, press lines must be installed in accordance with the number of press steps. Accordingly, the pipe forming cost of UOE steel pipes becomes high when compared to that of electric resistance welding steel pipes which can be formed immediately after a hot-rolled steel strip having a requested length is fed from a coil.

As described above, hot-rolled steel strips are advantageous over steel plates to provide inexpensive starting materials for forming steel pipes.

Appropriate conditions of rolling and cooling schedules for effectively employing ferrite/austenite inverse transformation have been discovered according to the manufacturing method using a hot-rolled steel strip and Japanese Unexamined Patent Application Publication No. 2001-207220. However, when the steel sheet thickness is approximately 20 mm, a facility having higher cooling capability must be installed to execute the manufacturing while the cooling rate is ensured to satisfy the cooling schedule disclosed in JP '220. As a result, construction of new production lines and increase in cost may be necessary in some cases.

In addition, the difference in temperature between the surface portion and the central portion is increased when the steel sheet thickness is increased. Hence, measures must be taken to avoid the formation of non-uniform texture caused by the difference in cooling rate along the sheet thickness direction.

Also, a cooling rate of 20° C./sec or more and a coiling temperature of 250° C. or less are necessary to obtain fine bainite according to Japanese Unexamined Patent Application Publication No. 64-25916, since the hardening properties are controlled by appropriately decreasing the C content and the Mn content. However, in general, it is very difficult to cool uniformly and rapidly over the entire region in the thickness direction as the steel sheet thickness is increased. A facility having a powerful cooling capability must be installed when thick materials are formed. Hence, the manufacturing method described above has a limitation when being used in practice.

It would, therefore, be advantageous to provide a hot-rolled steel strip having superior low temperature toughness and weldability and advantageous manufacturing method thereof.

SUMMARY

The hot-rolled steel strip can be manufactured at a low cost without constructing new facilities and increasing cost and is preferably used for forming high strength electric resistance welding steel pipes.

In accordance with one aspect, a hot-rolled steel strip comprises: on a mass percent basis, about 0.005 to about 0.04% of C; about 0.05 to about 0.3% of Si; about 0.5 to about 2.0% of Mn; about 0.001 to about 0.1% of Al; about 0.001 to about 0.1% of Nb; about 0.001 to about 0.1% of V; about 0.001 to about 0.1% of Ti; about 0.03% or less of P; about 0.005% or less of S; about 0.006% or less of N; at least one selected from the group consisting of about 0.5% or less of Cu, about 0.5% or less of Ni, and about 0.5% or less of Mo; and the balance being Fe and incidental impurities. In the hot-rolled steel strip described above, Pcm represented by the following equation (1) is 0.17 or less:

$$Pcm = (\% C) + (\% Si)/30 + ((\% Mn) + (\% Cu))/20 + (\% Ni)/60 + (\% Mo)/7 + (\% V)/10 \quad \text{Equation (1)}$$

in which (% M) indicates the content of element M on a mass percent basis, and the hot-rolled steel strip is composed of bainitic ferrite as a primary phase at a content of about 95 percent by volume or more.

The ratio in percent of the amount of precipitated Nb to the total amount of Nb (hereinafter referred to as a "Nb precipitation ratio") is preferably from about 5 to about 80%.

The hot-rolled steel strip described above may further comprise about 0.005% or less, of Ca and/or REM on a mass percent basis.

In addition, the hot-rolled steel strip described above may further comprise at least one selected from the group consisting of about 0.1% or less of Cr and about 0.003% or less of B, wherein Pcm' represented by the following equation (2) may be 0.17 or less:

$$Pcm' = (\% C) + (\% Si)/30 + ((\% Mn) + (\% Cu) + (\% Cr))/20 + (\% Ni)/60 + (\% Mo)/7 + (\% V)/10 \quad \text{Equation (2),}$$

in which (% M) indicates the content of element M on a mass percent basis.

According to another aspect, a method for manufacturing a hot-rolled steel strip having superior low temperature toughness and weldability for high strength electric resistance welding pipe, comprises: heating a steel slab having one of the compositions described above to about 1,000 to about 1,300° C.; performing finish rolling of the heated steel slab to form a steel strip; completing the finish rolling under the condition in which the steel strip has a surface temperature of about ($Ar_3$–50° C.) or more; starting cooling immediately after the completion of the finish rolling; and coiling the steel strip at a temperature of about 700° C. or less for slow cooling.

As described above, as starting materials for forming high strength electric resistance welding steel pipes, instead of the steel plates which have been primarily used for this purpose, hot-rolled steel strips having high strength and superior toughness of weld portions can be provided at a low cost and can be significantly effectively used in the industrial fields.

DETAILED DESCRIPTION

Selected aspects of the steel compositions are described below. In the embodiments selected for illustration herein, "%"used for components indicates "mass %", unless otherwise stated.

C: about 0.005 to about 0.04%.

Carbon (C) is an important element to ensure strength. The content of C must be about 0.005% or more to ensure a desired strength. However, when the content is more than about 0.04%, due to increase in carbon content, in addition to degradation in weldability, martensite is liable to be formed when the cooling rate is high. In contrast, when the cooling rate is low, pearlite is liable to be formed. Accordingly, in both cases, the toughness of steel may be degraded in some cases. Hence, the content of C is limited from about 0.005 to about 0.04%.

Si: About 0.05 to About 0.3%

Silicon (Si) is a useful element as a deoxidizing agent for steel. However, in the case in which the content thereof is high, degradation in toughness of a weld portion occurs since an Mn—Si-based non-metallic inclusion is formed when electric resistance welding is performed. Hence, the upper limit of the Si content is set to about 0.3%. In contrast, the lower limit thereof is set to about 0.05% in consideration of the deoxidizing effect and current steel manufacturing techniques.

Mn: About 0.5 to About 2.0%

At least about 0.5% of Manganese (Mn) is necessary to ensure adequate strength. However, when the content thereof is high, since the toughness and weldability are degraded as is the case of element C, the upper limit is set to about 2.0%.

Al: About 0.001 to About 0.1%

Aluminum (Al) is a useful element as a deoxidizing agent for steel as is Si. However, degradation in steel properties may occur in some cases in which the content thereof is high since an alumina-based inclusion is formed. Hence, the upper limit is set to about 0.1%. In contrast, the lower limit is set to about 0.001% in consideration of the deoxidizing effect.

Nb: About 0.001 to About 0.1%

Niobium (Nb) suppresses coarsening of austenite grains and recrystallization thereof and is effective to improve strength by refining. However, when the content thereof is less than about 0.001%, the effect is not sufficiently obtained. On the other hand, when the content is more than about 0.1%, weldability may be degraded in some cases. Hence, the content of Nb is set from about 0.001 to about 0.1%.

V: About 0.001 to About 0.1%

Vanadium (V) is a useful element for improving strength by precipitation hardening. However, the effect described above cannot be fully obtained when the content is less than about 0.001%. In contrast, weldability is degraded when the content is more than about 0.1%. Accordingly, the content of V is set from about 0.001 to about 0.1%.

Ti: About 0.001 to About 0.1%

Titanium (Ti) not only ensures toughness by preventing coarsening of austenite grains, but also effectively increases strength by precipitation hardening. However, the effect described above cannot be fully obtained when the content is less than about 0.001%. In contrast, weldability is degraded when the content is more than about 0.1%. Accordingly, the content of Ti is set from about 0.001 to about 0.1%.

P: About 0.03% or Less; S: About 0.005% or Less; N: About 0.006% or Less

Phosphorous (P) is an element present in steel as an impurity, is liable to segregate and causes degradation in toughness of steel. Hence, the upper limit of the content is set to about 0.03%.

As is the case of element P, sulfur (S) causes degradation in toughness of steel. Hence, the upper limit of the content is set to about 0.005%.

As are the cases of elements P and S, nitrogen N causes degradation in toughness of steel. Hence, the upper limit of the content is set to about 0.006%.

The cooling rate after hot rolling must be controlled to a certain extent to stably obtain bainitic ferrite since the hardening properties are controlled by the lower carbon content. Hence, the following elements are used to complement the hardening properties and prevent generation of pearlite and polygonal ferrite which tend to be formed during slow cooling. At least one selected from the group consisting of Cu: about 0.5% or less; Ni: about 0.5% or less, and Mo: about 0.5% of less Those mentioned above are all useful elements for hardenability and improving strength. They are preferably used at a content of about 0.05% or more. However, when a large amount thereof, such as more than about 0.5% is used, in addition to decrease in weldability and toughness, manufacturing cost of the alloy is increased. Hence, the contents thereof are each set to about 0.5% or less. In addition, although Ni effectively serves to improve toughness, a large amount thereof may cause degradation in toughness at a weld portion.

Heretofore, the basic components are described, and in addition to those described above, the following elements may also be optionally used.

Ca and/or REM: About 0.005% or Less

Calcium (Ca) is used to change a harmfully elongated MnS inclusion, which degrades low temperature toughness, into harmless CaS by replacement. However, a Ca-based oxide may adversely influence the toughness when the content of Ca is more than about 0.005%. A rare earth metal (REM) also has the same effect as described above. Accordingly, in both cases in which those elements are used alone and in combination, the content thereof is preferably about 0.005% or less.

Cr: About 0.1% or Less

Chromium (Cr) may be expected to improve the corrosion resistance as long as the content thereof is small and, in particular, corrosion resistance under light-sour (weak acidic gas) conditions can be improved. However, corrosion resistance is degraded when the content is more than about 0.1%. Hence, the content thereof is preferably about 0.1% or less.

B: About 0.003% or Less

Boron (B) is a useful element to improve strength. The content thereof is preferably set to about 0.0005% or more. However, the effect described above is not further improved when the content is more than about 0.003%. Hence, the content of B is preferably set to about 0.003% or less.

$$Pcm = (\% \text{ C}) + (\% \text{ Si})/30 + ((\% \text{ Mn}) + (\% \text{ Cu}))/20 + (\% \text{ Ni})/60 + (\% \text{ Mo})/7 + (\% \text{ V})/10 \leq 0.17$$

$$Pcm' = (\% \text{ C}) + (\% \text{ Si})/30 + ((\% \text{ Mn}) + (\% \text{ Cu}) + (\% \text{ Cr}))/20 + (\% \text{ Ni})/60 + (\% \text{ Mo})/7 + (\% \text{ V})/10 \leq 0.17$$

The above Pcm and Pcm' are indexes of weld cracking sensitivity. Pcm indicates an index when Cr is not contained and Pcm' is an index when Cr is contained.

Next, the toughness of a weld portion is intensively examined by a crack tip opening displacement (hereinafter referred to as "CTOD") test. This CTOD test is one of the test methods that have been widely used for toughness evaluation of steel plates. According to this CTOD test, it was confirmed that when a large amount of martensite is formed in welding, the cracking sensitivity increases and, as a result, toughness decreases. As an index indicating hardening properties, that is, the degree of easiness of martensite formation at a weld portion, the above Pcm (or Pcm' when Cr is contained; hereinafter, this description will be omitted for convenience) is employed, and it was also confirmed that Pcm values and CTOD test results have quite a close correlation therebetween.

Figure 1:
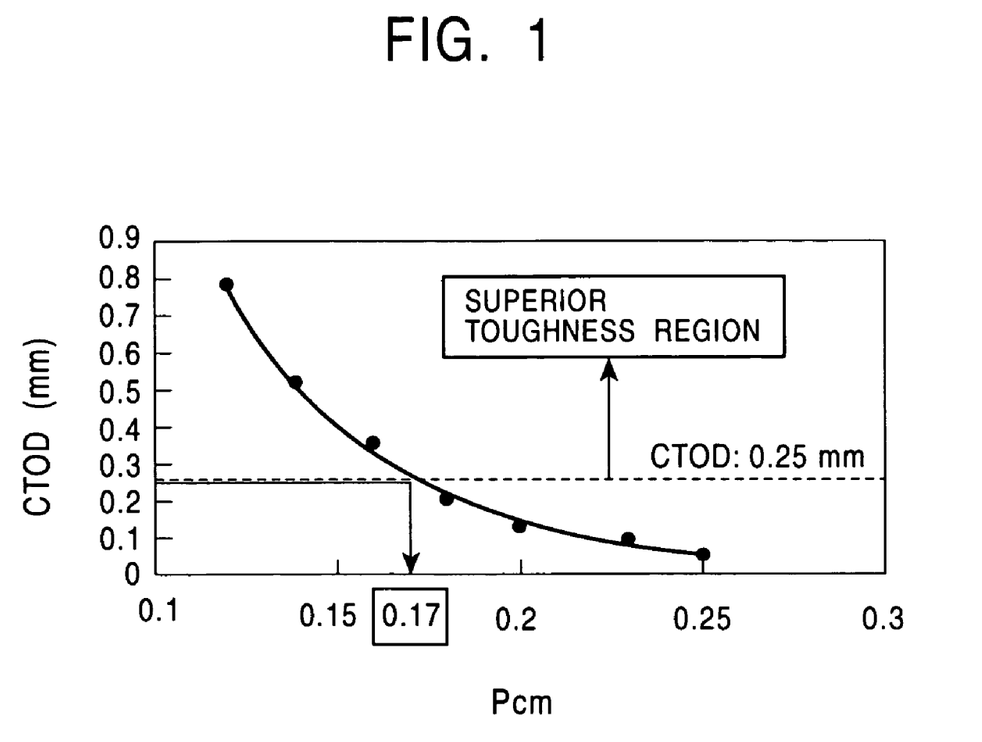
FIG. 1 is a graph showing the relationship between CTOD values and Pcm values.

The relationship between the CTOD value at a weld portion and the Pcm value is shown FIG. 1. It is understood that when the composition is controlled to have a Pcm value of 0.17 or less, the CTOD value becomes 0.25 mm or more at which it is believed that superior toughness can be obtained.

Next, the steel microstructure will be described.

Bainitic Ferrite: About 95 Percent by Volume or More.

The reason the steel microstructure is composed of bainitic ferrite as a primary phase is to ensure strength and toughness. A fine grain must be formed to ensure strength. It is preferable from this point of view that bainitic ferrite have a crystal grain diameter of approximately 10 μm or less. In this embodiment, the crystal grain diameter is represented by the nominal grain diameter. The nominal grain diameter is obtained by multiplying the average length of crystal grains obtained by a section method by $2/(\pi)^{1/2}$ using L section micrographs.

Next, as for the toughness of a mother material, a single phase microstructure is advantageous, and the generation of pearlite, upper and lower bainite, and martensite in the microstructure must be suppressed to less than about 5 percent by volume. The toughness of a weld portion is substantially determined by a chemical component. It was confirmed that when a bainitic ferrite single phase (a phase ratio of about 95 percent by volume or more) has a Pcm value of 0.17 or less, superior toughness can be obtained.

Bainitic ferrite has a ferrite microstructure transformed at low temperature in which a great number of dislocations are present in the grains and is apparently different from polygonal ferrite (soft pro-eutectoid ferrite transformed at a high temperature) which is common ferrite. In addition, the area ratio of the bainitic ferrite obtained by image processing of sectional micrographs thereof is converted into the volume ratio of the bainitic ferrite.

Precipitation hardening is performed by precipitation of alloy elements such as Nb to ensure strength in response to a lower carbon content. The precipitation of alloy elements is effective to increase the strength. However, the ratio in percent of the amount of precipitated Nb to the total amount of Nb (hereinafter referred to as a "Nb precipitation ratio") is advantageously controlled from about 5 to about 80% to obtain a preferably higher strength while the CTOD toughness is retained since a large amount of precipitation significantly decreases toughness.

The upper limit of the Nb precipitation ratio is preferably set to approximately 80%. The Nb precipitation ratio is preferably controlled to be about 60% or less and more preferably about 30% or less to increase toughness. However, the Nb precipitation ratio must be at least about 5% to ensure the strength. The Nb precipitation ratio is represented by the following equation.

Nb precipitation ratio={amount of precipitated Nb (mass %)/amount of the total Nb (mass %)}×100

Figure 2:
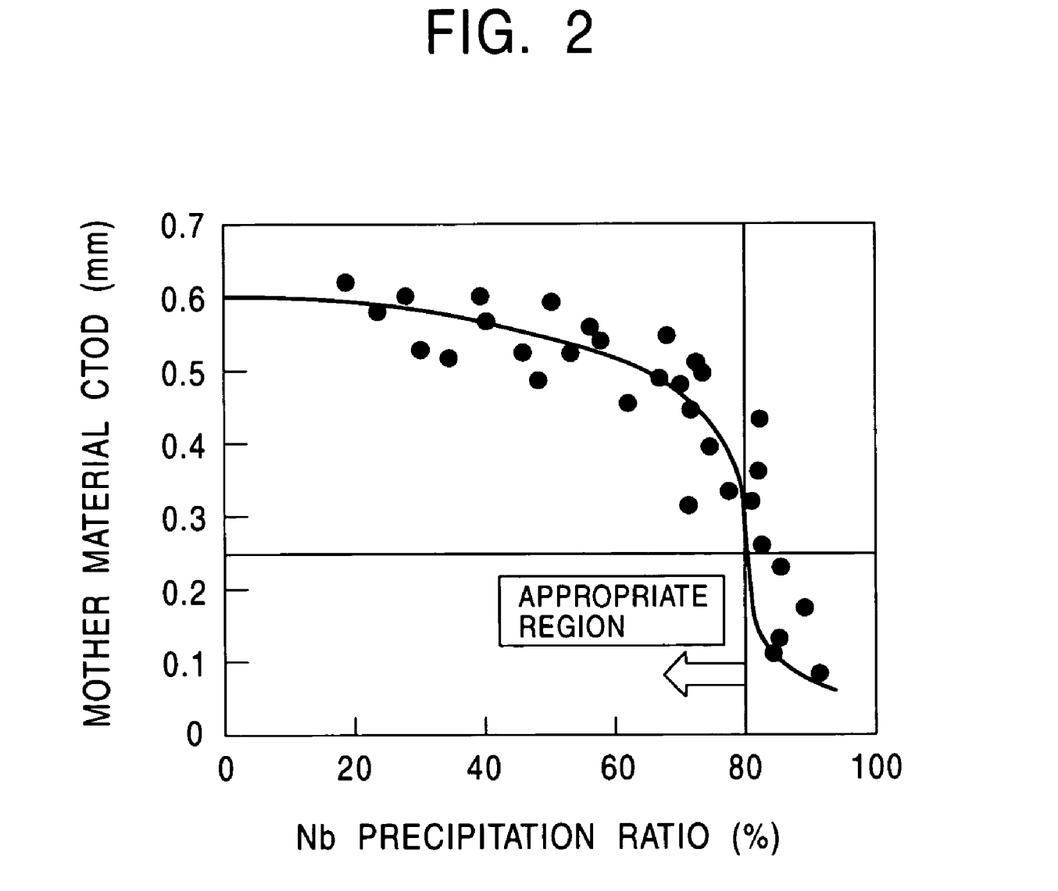
FIG. 2 is a graph showing the relationship between the Nb precipitation ratio and mother material CTOD.

The relationship between the Nb precipitation ratio and the mother material CTOD is shown in FIG. 2. Two types of steel, that is, steel 1 and steel 2 were used for this evaluation and both were acceptable. Hence, in FIG. 2, steel 1 and steel 2 are not discriminated from each other. The chemical composition of steel 1 includes, on a mass percent basis, 0.011% of C, 0.22% of Si, 1.45% of Mn, 0.045% of Nb, 0.075% of V, 0.01% of Cu, 0.01% of Ni, and the balance being Fe and incidental impurities. The chemical composition of steel 2 includes, on a mass percent basis, 0.028% of C, 0.24% of Si, 1.62% of Mn, 0.048% of Nb, 0.071% of V, 0.01% of Cu, 0.01% of Ni, and the balance being Fe and incidental impurities.

Continuously cast slabs of steel 1 and steel 2 were each processed by rolling at a heating temperature of 1,200° C. and a finish temperature of 800° C. to form hot-rolled steel strips. From the hot-rolled steel strips, test pieces (10 mm square by 50 mm) for analysis of precipitations and test pieces for the CTOD test were formed. The relationship between the Nb precipitation ratio and the mother material CTOD was investigated by the test pieces thus formed. In this embodiment, the mother material CTOD means a CTOD test performed using samples obtained by cutting a pipe body.

For the chemical analysis of precipitates, first, low current electrolysis was performed at a low current density (approximately 20 mA/cm$^2$) for the test piece in a maleic acid base electrolyte (10% of maleic acid, 2% of acetyl acetone, 5% of tetramethylammonium chloride, and methanol), a residue obtained therefrom was collected using a membrane filter (47 mm in diameter, pore size: 0.2 μm). Subsequently, the filter and the residue were burned to ashes, followed by melting in a molten mixture composed of lithium borate ($Li_2B_4O_7$) and sodium peroxide ($Na_2O_2$). A molten material obtained by this fusion was dissolved in a hydrochloric acid solution and then diluted to a predetermined volume with water and, subsequently, quantitative analysis was performed by an ICP emission analytical method.

Figure 3A:
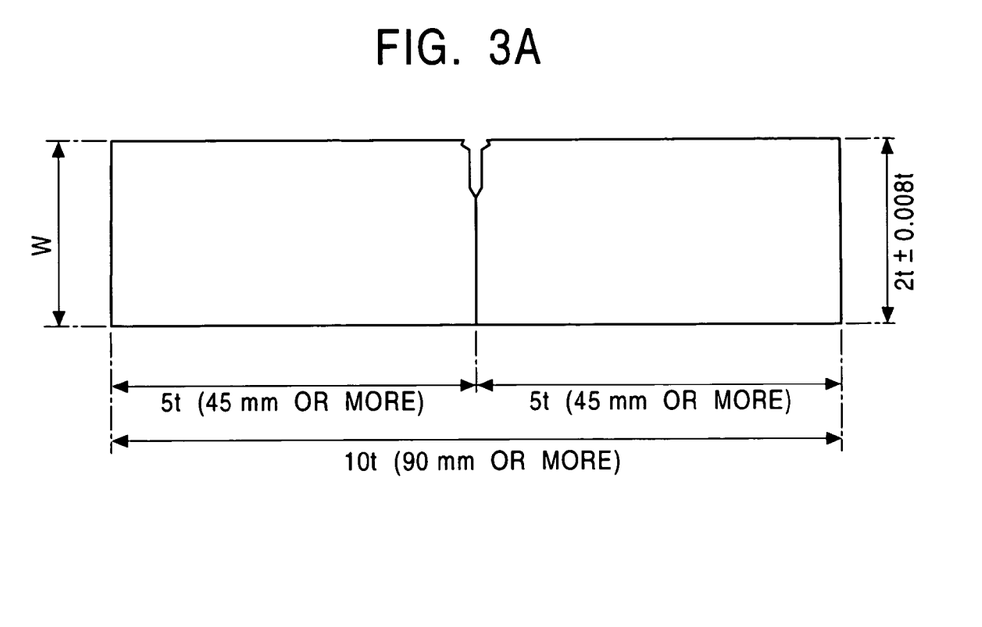
FIGS. 3A and 3B are schematic views showing the dimensions and the shape of a CTOD test piece.
Figure 3B:
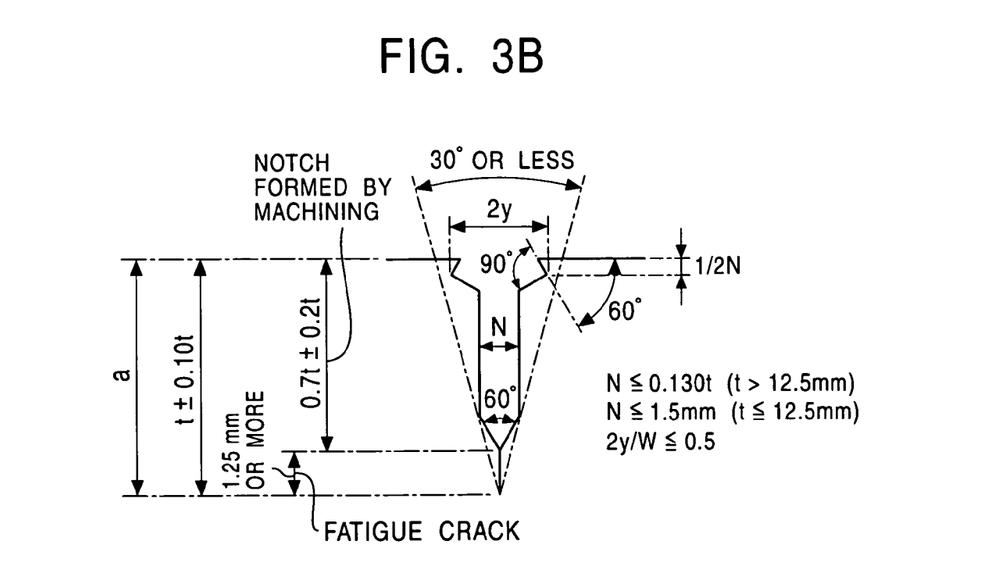

The CTOD test was performed in accordance with BS 7448: Part 1 1991 of British Standard, and the test pieces for this test were each obtained from a pipe along the circumferential direction and had a notch in the longitudinal direction of the pipe. The shape and dimensions of the test piece are shown in FIGS. 3A and 3B.

As shown in FIG. 2, the Nb precipitation ratio and the mother material CTOD value has a correlation therebetween. It was found that in order to obtain a critical CTOD value of 0.25 mm or more, it is effective that the Nb precipitation ratio is set to about 80% or less.

Subsequently, preferable manufacturing conditions for the steel of the invention will be described.

Steel having the preferable compositions described above is melted in a converter or the like and then formed into a slab by a continuous casting method or the like.

Slab Heating Temperature: About 1,000 to About 1,300° C.

To improve the toughness of steel sheets, heating is preferably performed at a lower heating temperature to obtain finer crystal grains. However, when the temperature is less than about 1,000° C., the necessary strength may not be obtained in some cases. In addition, since slab heating is generally performed at approximately 1,200° C. in many cases, the number of the slab heating operations described above may be limited, thereby resulting in decreased efficiency. In contrast, when the temperature is more than about 1,300° C., coarsening of austenite grains occurs, which disadvantageously influences the toughness and, in addition, energy loss or degradation in surface conditions caused by an increase in the amount of scale may occur in some cases.

Finish Rolling Temperature: About ($Ar_3$–50° C.) or More

The finish rolling temperature must be set to about ($Ar_3$–50° C.) or more to complete rolling while uniform grain size and microstructure are maintained. The finish rolling temperature mentioned above is the temperature measured on a surface of a steel sheet at the discharge side of a finish rolling machine. When this finish rolling temperature is less than about ($Ar_3$–50° C.), ferrite transformation occurs inside the steel sheet during finish rolling, the microstructure becomes non-uniform and, as a result, desired properties are not obtained.

Cooling Immediately After Completion of Rolling

Since ferrite transformation occurs during air cooling performed after rolling, in order to prevent the decrease in strength and toughness caused by formation of soft and coarse ferrite, cooling must be started immediately after the completion of rolling. The word "immediately" means that cooling is preferably started within about 10 seconds after the completion of rolling.

In addition, the cooling rate after finish rolling is not particularly limited. However, when the cooling rate is too slow, the cooling rate is preferably set to approximately 3° C./sec or more since desired bainitic ferrite may not be obtained in some cases.

Coiling Temperature: About 700° C. or Less

Ferrite grain coarsening occurs when the coiling temperature is more than about 700° C. The toughness is very much decreased as a result. Accordingly, in order to obtain fine grains and, in addition, to set the Nb precipitation ratio in a preferable region in which a superior CTOD value according to the invention can be obtained, the coiling temperature is preferably set to about 700° C. or less, more preferably about 600° C. or less, and even more preferably about 550° C. or less. In addition, the amount of precipitation must be increased to ensure strength. However, a sufficient amount of precipitation cannot be obtained at about 250° C. or less.

Figure 4:
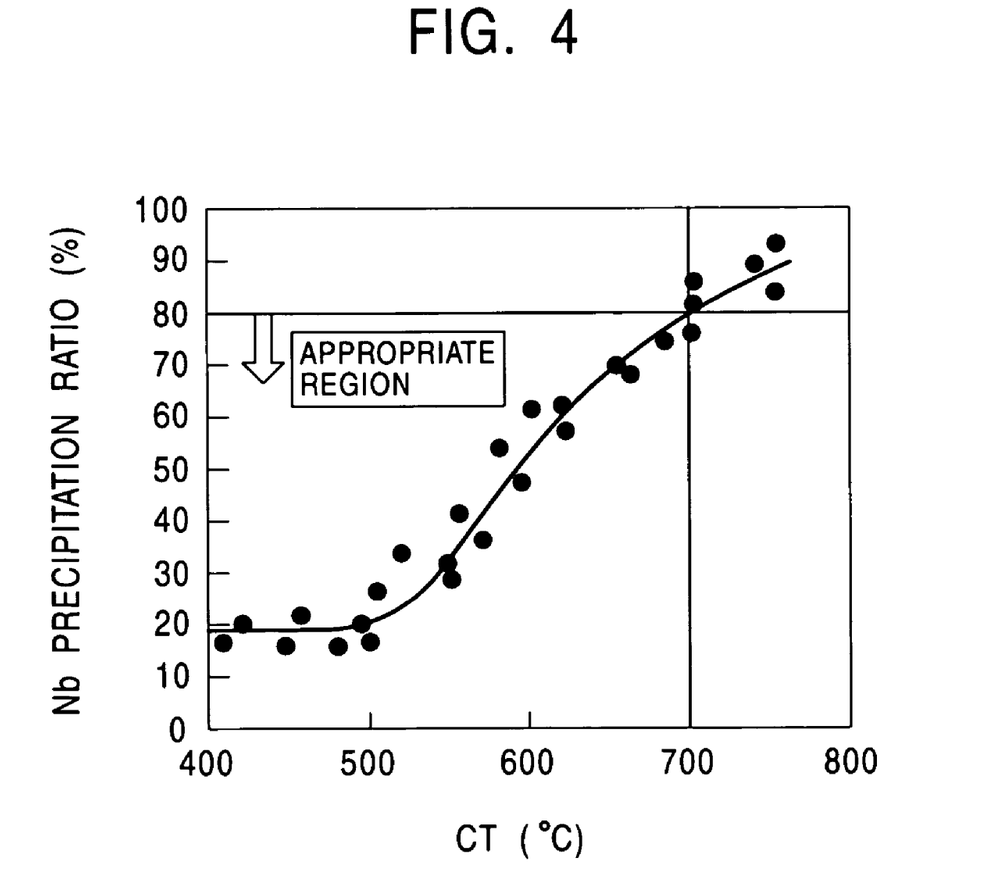
FIG. 4 is a graph showing the relationship between coiling temperatures (CT) and the Nb precipitation ratio.

FIG. 4 shows the relationship between the coiling temperature (hereinafter referred to as "CT" in some cases) and the Nb precipitation ratio. It is understood that the Nb precipitation ratio is proportional to CT. When CT is more than about 700° C., the Nb precipitation ratio becomes more than about 80%. Hence, CT is preferably controlled to be about 700° C. or less to obtain superior toughness. In particular, CT is preferably set to about 600° C. or less.

EXAMPLE 1

Continuously cast slabs having compositions shown in Table 1 were processed under the conditions shown in Table 2, thereby forming hot-rolled steel strips. The mechanical properties and the steel microstructures of the hot-rolled steel strips thus formed were measured. The results are also shown in Table 2.

The toughness of the mother material and the weld portion was evaluated by a CTOD test performed at a testing temperature of −10° C. The dimensions and shape of the CTOD test piece are as shown in FIGS. 3A and 3B. In addition, the test piece for the weld portion was obtained from a flat steel sheet formed by electric welding so that the longitudinal direction of the test piece is perpendicular to the welding line. Next, the CTOD value was obtained by a three-point bent test in accordance with BS 7448 in which a clip gauge was provided outside the anticipated fatigue crack extension path and the notch. The toughness was regarded as superior when the CTOD value is 0.25 mm or more.

In addition, in Table 2, αB indicates bainitic ferrite, αP indicates polygonal ferrite, B indicates bainite, P indicates pearlite, and MA indicates island-shaped martensite.

As shown in Table 2, according to examples (steel A to H) of the invention, it was found that the steel microstructure is composed of bainitic ferrite as a primary phase, in which αB≧95 percent by volume is satisfied; the strength is high such that YS≧560 MPa is satisfied; and the toughness of the mother material and the weld portion are superior, each having a CTOD value of 0.25 mm or more.

In contrast, according to steels I to R, which were outside our conditions, a desired toughness could not be obtained.

EXAMPLE 2

Continuously cast slabs having compositions shown in Table 3 were processed under the conditions shown in Table 4, thereby forming hot-rolled steel strips.

The mechanical properties, steel microstructures, and Nb precipitation ratios of the hot-rolled steel strips thus formed were measured. The results are also shown in Table 4. As can be seen from Table 4, particularly, the microstructure having a Nb precipitation ratio of 5 to 80% has both superior strength and toughness.

On the other hand, according to the result obtained from No. 5 shown in Table 4, since the coiling temperature was more than 700° C., the Nb precipitation ratio was high and, in addition, coarsening of austenite grains occurred, thereby resulting in degradation in toughness.

In addition, according to the result obtained from No. 8 shown in Table 4, since the coiling temperature was low, in addition to a decrease in the Nb precipitation ratio, MA was precipitated, and the volume fraction ratio of $\alpha B$ decreased, resulting in a decrease in strength and toughness.

EXAMPLE 3

Continuously cast slabs having compositions shown in Table 5 were processed under the conditions shown in Table 6, thereby forming hot-rolled steel strips. The mechanical properties, steel microstructures, and Nb precipitation ratios of the hot-rolled steel strips thus formed were measured. The results are also shown in Table 6.

According to our examples (steels T to X), it was found that the steel microstructure is composed of bainitic ferrite as a primary phase in which $\alpha B \geqq 95$ percent by volume is satisfied; the strength is high such that $YS \geqq 652$ MPa is satisfied; and the toughness of the mother material and the weld portion are superior, each having a CTOD value of 0.28 mm or more.

In contrast, according to steel Y, since Pcm and the amount of Ca were outside the appropriate region, the CTOD value of the weld portion was low, and the cleanness of steel was degraded by excessive addition of Ca. Consequently, a desired toughness could not be obtained.

TABLE 1

| STEEL | COMPOSITION (mass %) | | | | | | | | | | | | | Pcm. OR Pcm' | REMARKS |
|---|---|---|---|---|---|---|---|---|---|---|---|---|---|---|---|
| | C | Si | Mn | P | S | N | Al | Nb | V | Ti | Cu | Ni | Mo | | |
| A | 0.022 | 0.23 | 1.45 | 0.015 | 0.002 | 0.001 | 0.026 | 0.045 | 0.071 | 0.014 | 0.31 | — | 0.15 | 0.146 | RIGHT STEEL |
| B | 0.027 | 0.24 | 1.46 | 0.018 | 0.002 | 0.001 | 0.03 | 0.044 | 0.068 | 0.015 | — | — | 0.15 | 0.136 | RIGHT STEEL |
| C | 0.025 | 0.25 | 1.45 | 0.015 | 0.003 | 0.001 | 0.026 | 0.045 | 0.071 | 0.014 | 0.31 | — | 0.15 | 0.149 | RIGHT STEEL |
| D | 0.039 | 0.24 | 1.19 | 0.013 | 0.002 | 0.002 | 0.03 | 0.048 | 0.069 | 0.045 | 0.21 | 0.29 | 0.10 | 0.143 | RIGHT STEEL |
| E | 0.032 | 0.21 | 1.34 | 0.019 | 0.001 | 0.002 | 0.03 | 0.032 | 0.077 | 0.070 | 0.27 | 0.29 | 0.11 | 0.148 | RIGHT STEEL |
| F | 0.008 | 0.19 | 1.50 | 0.012 | 0.001 | 0.003 | 0.02 | 0.039 | 0.069 | 0.015 | 0.35 | 0.36 | 0.30 | 0.163 | RIGHT STEEL |
| G | 0.033 | 0.21 | 1.34 | 0.014 | 0.001 | 0.003 | 0.02 | 0.066 | 0.077 | 0.027 | 0.30 | 0.50 | 0.13 | 0.150 | RIGHT STEEL |
| H | 0.030 | 0.21 | 1.34 | 0.012 | 0.001 | 0.003 | 0.02 | 0.061 | 0.080 | 0.011 | 0.29 | 0.31 | 0.12 | 0.150 | RIGHT STEEL |
| I | 0.029 | 0.51 | 1.44 | 0.017 | 0.002 | 0.002 | 0.027 | 0.048 | 0.072 | 0.015 | 0.20 | 0.30 | 0.15 | 0.162 | COMPARATIVE STEEL |
| J | 0.029 | 0.25 | 2.30 | 0.017 | 0.002 | 0.002 | 0.027 | 0.048 | 0.072 | 0.015 | 0.15 | 0.05 | 0.08 | 0.179 | COMPARATIVE STEEL |
| K | 0.051 | 0.20 | 1.50 | 0.012 | 0.002 | 0.002 | 0.030 | 0.049 | 0.078 | 0.040 | 0.32 | 0.45 | 0.10 | 0.178 | COMPARATIVE STEEL |
| L | 0.003 | 0.22 | 1.31 | 0.010 | 0.001 | 0.002 | 0.020 | 0.032 | 0.074 | 0.060 | 0.25 | 0.29 | 0.12 | 0.118 | COMPARATIVE STEEL |
| M | 0.040 | 0.18 | 1.60 | 0.010 | 0.001 | 0.002 | 0.030 | 0.040 | 0.070 | 0.010 | 0.29 | 0.30 | 0.20 | 0.181 | COMPARATIVE STEEL |
| N | 0.030 | 0.19 | 0.40 | 0.010 | 0.001 | 0.002 | 0.020 | 0.050 | 0.070 | 0.030 | 0.31 | 0.33 | 0.10 | 0.099 | COMPARATIVE STEEL |
| O | 0.030 | 0.21 | 1.39 | 0.020 | 0.001 | 0.003 | 0.020 | 0.030 | 0.200 | 0.030 | 0.30 | 0.41 | 0.25 | 0.184 | COMPARATIVE STEEL |
| P | 0.030 | 0.22 | 1.41 | 0.010 | 0.002 | 0.002 | 0.030 | 0.030 | 0.070 | 0.020 | 0.60 | 0.30 | 0.20 | 0.178 | COMPARATIVE STEEL |
| Q | 0.040 | 0.31 | 1.38 | 0.010 | 0.001 | 0.003 | 0.020 | 0.050 | 0.080 | 0.010 | 0.30 | 0.60 | 0.20 | 0.181 | COMPARATIVE STEEL |
| R | 0.030 | 0.21 | 1.39 | 0.010 | 0.001 | 0.003 | 0.020 | 0.060 | 0.070 | 0.020 | 0.30 | 0.35 | 0.60 | 0.220 | COMPARATIVE STEEL |

TABLE 2

| STEEL | Ar₃ (° C.) | MANUFACTURING CONDITIONS ||||| MECHANICAL PROPERTIES |||| MICRO-STRUCTURE OF MOTHER TEXTURE | RATIO OF α_B TEXTURE (vol %) | REMARKS |
| --- | --- | --- | --- | --- | --- | --- | --- | --- | --- | --- | --- | --- |
| | | HEATING TEMPERATURE (° C.) | FINISH TEMPERATURE (° C.) | COOLING RATE (° C./s) | COILING TEMPERATURE (° C.) | THICKNESS (mm) | YS (MPa) | MOTHER MATERIAL CTOD (mm) | WELD PORTION CTOD (mm) | | | |
| A | 760 | 1200 | 780 | 8 | 580 | 15.9 | 622 | 0.32 | 0.26 | α_B | 100 | EXAMPLE |
| B | 770 | 1200 | 800 | 8 | 520 | 19.1 | 604 | 0.32 | 0.27 | α_B | 100 | EXAMPLE |
| C | 760 | 1200 | 805 | 10 | 550 | 12.7 | 661 | 0.40 | 0.30 | α_B + B | 97 | EXAMPLE |
| D | 770 | 1200 | 810 | 15 | 610 | 15.9 | 630 | 0.43 | 0.35 | α_B | 97 | EXAMPLE |
| E | 760 | 1200 | 800 | 15 | 600 | 15.9 | 660 | 0.48 | 0.39 | α_B | 97 | EXAMPLE |
| F | 730 | 1200 | 795 | 15 | 620 | 15.9 | 560 | 0.49 | 0.40 | α_B | 98 | EXAMPLE |
| G | 740 | 1200 | 805 | 7 | 590 | 20.6 | 585 | 0.54 | 0.44 | α_B | 97 | EXAMPLE |
| H | 760 | 1200 | 810 | 20 | 610 | 9.0 | 620 | 0.44 | 0.36 | α_B | 97 | EXAMPLE |
| I | 750 | 1200 | 795 | 10 | 610 | 19.1 | 680 | 0.36 | 0.13 | α_B + P | 95 | COMPARATIVE EXAMPLE |
| J | 700 | 1200 | 800 | 7 | 600 | 20.6 | 689 | 0.17 | 0.09 | α_B + B + P | 90 | COMPARATIVE EXAMPLE |
| K | 730 | 1200 | 800 | 15 | 600 | 15.9 | 670 | 0.18 | 0.18 | α_B + MA | 93 | COMPARATIVE EXAMPLE |
| L | 770 | 1200 | 800 | 15 | 620 | 15.9 | 485 | 0.21 | 0.32 | α_B + P | 0 | COMPARATIVE EXAMPLE |
| M | 730 | 1200 | 800 | 15 | 610 | 15.0 | 650 | 0.21 | 0.13 | α_B + MA | 94 | COMPARATIVE EXAMPLE |
| N | 830 | 1200 | 800 | 15 | 600 | 15.0 | 490 | 0.54 | 0.45 | α_B | 97 | COMPARATIVE EXAMPLE |
| O | 740 | 1200 | 795 | 15 | 620 | 15.0 | 620 | 0.21 | 0.11 | α_B + MA | 95 | COMPARATIVE EXAMPLE |
| P | 740 | 1200 | 800 | 15 | 605 | 15.0 | 603 | 0.22 | 0.17 | α_B + MA | 94 | COMPARATIVE EXAMPLE |
| Q | 730 | 1200 | 800 | 15 | 590 | 15.0 | 690 | 0.17 | 0.20 | α_B + MA | 94 | COMPARATIVE EXAMPLE |
| R | 710 | 1200 | 805 | 15 | 600 | 15.0 | 717 | 0.05 | 0.12 | α_B + MA | 93 | COMPARATIVE EXAMPLE |

α_P: POLYGONAL FERRITE,
α_B: BAINITIC FERRITE,
B: BAINITE,
P: PEARLITE,
MA: ISLAND-SHAPED MARTENSITE

TABLE 3

| STEEL | COMPOSITION (mass %) |||||||||||| Pcm OR Pcm[1] | REMARKS |
| --- | --- | --- | --- | --- | --- | --- | --- | --- | --- | --- | --- | --- | --- | --- |
| | C | Si | Mn | P | S | N | Al | Nb | V | Ti | Cu | Mo | | |
| A | 0.022 | 0.23 | 1.45 | 0.015 | 0.002 | 0.001 | 0.026 | 0.045 | 0.071 | 0.014 | 0.31 | 0.15 | 0.146 | RIGHT STEEL |
| B | 0.027 | 0.24 | 1.46 | 0.018 | 0.002 | 0.001 | 0.030 | 0.044 | 0.068 | 0.015 | — | 0.15 | 0.136 | RIGHT STEEL |
| S | 0.025 | 0.25 | 1.45 | 0.015 | 0.002 | 0.001 | 0.026 | 0.045 | 0.071 | 0.014 | 0.31 | 0.15 | 0.149 | RIGHT STEEL |

TABLE 4

| No. | STEEL | Ar₃ (° C.) | MANUFACTURING CONDITIONS |||| MECHANICAL PROPERTIES ||| MICRO-STRUCTURE OF MOTHER TEXTURE | RATIO OF α_B TEXTURE (vol %) | Nb PRECIPITATION RATIO (%) | REMARKS |
| --- | --- | --- | --- | --- | --- | --- | --- | --- | --- | --- | --- | --- | --- |
| | | | HEATING TEMPERATURE (° C.) | FINISH TEMPERATURE (° C.) | COOLING RATE (° C./s) | COILING TEMPERATURE (° C.) | THICKNESS (mm) | YS (MPa) | MOTHER MATERIAL CTOD (mm) | | | | |
| 1 | A | 760 | 1200 | 780 | 8 | 580 | 15.9 | 622 | 0.32 | α_B | 100 | 60 | EXAMPLE |
| 2 | A | 760 | 1200 | 780 | 8 | 510 | 15.9 | 560 | 0.50 | α_B | 100 | 27 | EXAMPLE |
| 3 | B | 770 | 1200 | 800 | 8 | 640 | 19.1 | 632 | 0.30 | α_B | 100 | 65 | EXAMPLE |
| 4 | B | 770 | 1200 | 800 | 8 | 520 | 19.1 | 604 | 0.32 | α_B | 100 | 45 | EXAMPLE |

TABLE 4-continued

| | | MANUFACTURING CONDITIONS | | | | MECHANICAL PROPERTIES | | | MICRO-STRUCTURE OF MOTHER TEXTURE | RATIO OF $\alpha_B$ TEXTURE (vol %) | Nb PRECIPITATION RATIO (%) | |
|---|---|---|---|---|---|---|---|---|---|---|---|---|
| No. | STEEL | Ar$_3$ (°C.) | HEATING TEMPERATURE (°C.) | FINISH TEMPERATURE (°C.) | COOLING RATE (°C./s) | COILING TEMPERATURE (°C.) | THICKNESS (mm) | YS (MPa) | MOTHER MATERIAL CTOD (mm) | | | REMARKS |
| 5 | S | 760 | 1200 | 780 | 8 | 720 | 15.9 | 577 | 0.12 | $\alpha_P + \alpha_B + P$ | 93 | 90 | COMPARATIVE EXAMPLE |
| 6 | S | 760 | 1200 | 800 | 7 | 650 | 14.3 | 613 | 0.33 | $\alpha_B$ | 100 | 70 | EXAMPLE |
| 7 | S | 760 | 1200 | 800 | 7 | 580 | 14.3 | 618 | 0.40 | $\alpha_B$ | 100 | 58 | EXAMPLE |
| 8 | S | 760 | 1200 | 800 | 8 | 250 | 15.9 | 540 | 0.16 | $\alpha_B$ + MA | 70 | 4 | COMPARATIVE EXAMPLE |

$\alpha_P$: POLYGONAL FERRITE,
$\alpha_B$: BAINITIC FERRITE,
B: BAINITE,
P: PEARLITE,
MA: ISLAND-SHAPE MARTENSITE

TABLE 5

| | COMPOSITION (mass %) | | | | | | | | | | | | | | Pcm OR Pcm' | REMARKS |
|---|---|---|---|---|---|---|---|---|---|---|---|---|---|---|---|---|
| STEEL | C | Si | Mn | P | S | N | Al | Nb | V | Ti | Cu | Ni | Mo | OTHERS | | |
| T | 0.021 | 0.25 | 1.45 | 0.016 | 0.002 | 0.001 | 0.026 | 0.001 | 0.067 | 0.016 | 0.30 | 0.31 | 0.15 | Cr: 0.1, Ca: 0.0022 | 0.155 | RIGHT STEEL |
| U | 0.019 | 0.26 | 1.65 | 0.017 | 0.002 | 0.001 | 0.027 | 0.045 | 0.070 | 0.014 | 0.29 | 0.31 | — | B: 0.002 | 0.137 | RIGHT STEEL |
| V | 0.024 | 0.25 | 1.40 | 0.016 | 0.002 | 0.001 | 0.026 | 0.044 | 0.067 | 0.016 | 0.30 | 0.31 | 0.15 | Ca: 0.0020 | 0.151 | RIGHT STEEL |
| W | 0.024 | 0.25 | 1.40 | 0.016 | 0.002 | 0.001 | 0.026 | 0.044 | 0.067 | 0.016 | 0.30 | 0.31 | 0.15 | Ca: 0.0020 | 0.151 | RIGHT STEEL |
| X | 0.024 | 0.25 | 1.40 | 0.016 | 0.002 | 0.001 | 0.026 | 0.044 | 0.067 | 0.016 | 0.30 | 0.31 | 0.15 | REM: 0.0025 | 0.151 | RIGHT STEEL |
| Y | 0.034 | 0.25 | 1.44 | 0.017 | 0.002 | 0.002 | 0.027 | 0.048 | 0.072 | 0.015 | 0.35 | 0.30 | 0.22 | Ca: 0.0120 | 0.175 | COMPARATIVE STEEL |

TABLE 6

| | MANUFACTURING CONDITIONS | | | | | MECHANICAL PROPERTIES | | | | MICROSTRUCTURE OF MOTHER MATERIAL | RATIO OF $\alpha_B$ TEXTURE (vol %) | Nb PRECIPITATION RATIO (%) | |
|---|---|---|---|---|---|---|---|---|---|---|---|---|---|
| STEEL | Ar$_3$ (°C.) | HEATING TEMPERATURE (°C.) | FINISH TEMPERATURE (°C.) | COOLING RATE (°C./s) | COILING TEMPERATURE (°C.) | THICKNESS (mm) | YS (MPa) | MOTHER MATERIAL CTOD (mm) | WELD PORTION CTOD (mm) | | | | REMARKS |
| T | 750 | 1200 | 795 | 8 | 580 | 17.5 | 652 | 0.44 | 0.32 | $\alpha_B$ | 98 | 70 | EXAMPLE |
| U | 740 | 1200 | 800 | 8 | 590 | 15.9 | 735 | 0.35 | 0.28 | $\alpha_B$ + B | 95 | 58 | EXAMPLE |
| V | 750 | 1200 | 795 | 8 | 650 | 14.3 | 735 | 0.36 | 0.28 | $\alpha_B$ | 100 | 66 | EXAMPLE |
| W | 750 | 1200 | 795 | 8 | 590 | 14.3 | 726 | 0.45 | 0.32 | $\alpha_B$ | 100 | 61 | EXAMPLE |
| X | 750 | 1200 | 800 | 10 | 470 | 15.9 | 654 | 0.56 | 0.42 | $\alpha_B$ | 100 | 42 | EXAMPLE |
| Y | 740 | 1200 | 805 | 7 | 603 | 12.7 | 710 | 0.22 | 0.18 | $\alpha_B$ | 100 | 59 | COMPARATIVE EXAMPLE |

$\alpha_B$: BAINITIC FERRITE,
B: BAINITE

What is claimed is:

1. A coiled, hot-rolled steel strip having superior low temperature toughness and weldability for a high strength electric resistance welding pipe, comprising: on a mass percent basis,
about 0.005 to about 0.04% of C;
about 0.05 to about 0.3% of Si;
about 0.5 to about 2.0% of Mn;
about 0.001 to about 0.1% of Al;
about 0.001 to about 0.1% of Nb;
about 0.001 to about 0.1% of V;
about 0.001 to about 0.1% of Ti;
about 0.05 to about 0.5% of Mo;
about 0.03% or less of P;
about 0.005% or less of S;
about 0.006% or less of N;
at least one selected from the group consisting of about 0.5% or less of Cu and about 0.5% or less of Ni; and
the balance being Fe and incidental impurities,
wherein Pcm represented by the following equation (1) is 0.17 or less:

$$Pcm = (\% C) + (\% Si)/30 + ((\% Mn) + (\% Cu))/20 + (\% Ni)/60 + (\% Mo)/7 + (\% V)/10 \quad \text{Equation (1)},$$

in which (% M) indicates the content of element M on a mass percent basis, and
the hot-rolled steel strip is composed of bainitic ferrite as a primary phase at a content of about 95 percent by volume or more and having a yield strength of at least 560 MPa, and wherein the ratio in percent of the amount of precipitated Nb to the total amount of Nb is from 5 to about 80%.

2. A high strength electric resistant welding pipe formed from the coiled, hot-rolled steel strip according to claim 1.

3. The coiled, hot-rolled steel strip according to claim 1 wherein the hot-rolled steel strip is finished.

4. The coiled, hot-rolled steel strip according to claim 1; further comprising at least one component selected from the group consisting of about 0.1% or less of Cr and about 0.003% or less of B,
wherein Pcm' represented by the following equation (2) is 0.17 or less:

$$Pcm' = (\% C) + (\% Si)/30 + ((\% Mn) + (\% Cu) + (\% Cr))/20 + (\% Ni)/60 + (\% Mo)/7 + (\% V)/10 \quad \text{Equation (2)},$$

in which (% M) indicates the content of element M on a mass percent basis.

5. The coiled, hot-rolled steel strip according to claim 1; further comprising about 0.005% or less of Ca and/or REM on a mass percent basis.

6. The coiled, hot-rolled steel strip according to claim 5; further comprising at least one component selected from the group consisting of about 0.1% or less of Cr and about 0.003% or less of B,
wherein Pcm' represented by the following equation (2) is 0.17 or less:

$$Pcm' = (\% C) + (\% Si)/30 + ((\% Mn) + (\% Cu) + (\% Cr))/20 + (\% Ni)/60 + (\% Mo)/7 + (\% V)/10 \quad \text{Equation (2)},$$

in which (% M) indicates the content of element M on a mass percent basis.

7. A coiled, hot-rolled steel strip having superior low temperature toughness and weldability for a high strength electric resistance welding pipe, comprising: on a mass percent basis,
about 0.005 to about 0.04% of C;
about 0.05 to about 0.3% of Si;
about 0.5 to about 2.0% of Mn;
about 0.001 to about 0.1% of Al;
about 0.001 to about 0.1% of Nb;
about 0.001 to about 0.1% of V;
about 0.001 to about 0.1% of Ti;
about 0.05 to about 0.5% of Mo;
about 0.03% or less of P;
about 0.005% or less of S;
about 0.006% or less of N;
at least one selected from the group consisting of about 0.5% or less of Cu and about 0.5% or less of Ni; and
the balance being Fe and incidental impurities,
wherein Pcm represented by the following equation (1) is 0.17 or less:

$$Pcm = (\% C) + (\% Si)/30 + ((\% Mn) + (\% Cu))/20 + (\% Ni)/60 + (\% Mo)/7 + (\% V)/10 \quad \text{Equation (1)},$$

in which (% M) indicates the content of element M on a mass percent basis, and
the hot-rolled steel strip is composed of bainitic ferrite as a primary phase at a content of about 95 percent by volume or more and having a CTOD value of 0.25 mm or more, and wherein the ratio in percent of the amount of precipitated Nb to the total amount of Nb is from 5 to about 80%.

8. A high strength electric resistant welding pipe formed from the coiled, hot-rolled steel strip according to claim 7.

9. The coiled, hot-rolled steel strip according to claim 7; further comprising at least one component selected from the group consisting of about 0.1% or less of Cr and about 0.003% or less of B,
wherein Pcm' represented by the following equation (2) is 0.17 or less:

$$Pcm' = (\% C) + (\% Si)/30 + ((\% Mn) + (\% Cu) + (\% Cr))/20 + (\% Ni)/60 + (\% Mo)/7 + (\% V)/10 \quad \text{Equation (2)},$$

in which (% M) indicates the content of element M on a mass percent basis.

10. The coiled, hot-rolled steel strip according to claim 7; further comprising about 0.005% or less of Ca and/or REM on a mass percent basis.

11. The coiled, hot-rolled steel strip according to claim 10; further comprising at least one component selected from the group consisting of about 0.1% or less of Cr and about 0.003% or less of B,
wherein Pcm' represented by the following equation (2) is 0.17 or less:

$$Pcm' = (\% C) + (\% Si)/30 + ((\% Mn) + (\% Cu) + (\% Cr))/20 + (\% Ni)/60 + (\% Mo)/7 + (\% V)/10 \quad \text{Equation (2)},$$

in which (% M) indicates the content of element M on a mass percent basis.

* * * * *